(12) United States Patent
Poletaev et al.

(10) Patent No.: US 11,562,504 B1
(45) Date of Patent: Jan. 24, 2023

(54) SYSTEM, APPARATUS AND METHOD FOR PREDICTING LENS ATTRIBUTE

(71) Applicant: Goodsize Inc., Wilmington, DE (US)

(72) Inventors: Vsevolod Poletaev, Moscow (RU); Dmitrii Ulianov, Moscow (RU); Sergei Sherman, Givatayim (IL)

(73) Assignee: GOODSIZE INC., Wilmington, DE (US)

( * ) Notice: Subject to any disclaimer, the term of this patent is extended or adjusted under 35 U.S.C. 154(b) by 0 days.

(21) Appl. No.: 17/585,057

(22) Filed: Jan. 26, 2022

(51) Int. Cl.
*G06T 7/80* (2017.01)
*G06T 5/50* (2006.01)
*G06T 5/00* (2006.01)
*G06T 17/20* (2006.01)
*G06T 7/73* (2017.01)

(52) U.S. Cl.
CPC ............ *G06T 7/80* (2017.01); *G06T 5/006* (2013.01); *G06T 5/50* (2013.01); *G06T 7/73* (2017.01); *G06T 17/20* (2013.01); *G06T 2207/20081* (2013.01); *G06T 2207/20084* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 10,445,898 B2 | 10/2019 | Liu et al. | |
| 10,964,060 B2 | 3/2021 | Sunkavalli et al. | |
| 10,977,831 B2 | 4/2021 | Bazin et al. | |
| 11,094,083 B2 | 8/2021 | Eisenmann et al. | |
| 2017/0124680 A1* | 5/2017 | Holzer | G06F 16/738 |
| 2019/0018247 A1* | 1/2019 | Gao | G02B 27/0172 |
| 2020/0234467 A1 | 7/2020 | Tran et al. | |
| 2021/0390767 A1* | 12/2021 | Johnson | G06V 40/176 |

FOREIGN PATENT DOCUMENTS

| | | | |
|---|---|---|---|
| CN | 110176042 A | | 8/2019 |
| JP | 2020525953 | * | 8/2020 |
| WO | 2020187723 A1 | | 9/2020 |

* cited by examiner

Primary Examiner — Yanna Wu
(74) Attorney, Agent, or Firm — The Roy Gross Law Firm, LLC; Roy Gross (57) ABSTRACT

A system, apparatus, and method for predicting a camera lens attribute using a neural network are presented. The predicted camera lens parameter may be used to produce a 3D model of an object from one or more 2D images of the object.

24 Claims, 8 Drawing Sheets

SYSTEM, APPARATUS AND METHOD FOR PREDICTING LENS ATTRIBUTE

TECHNICAL FIELD

Some embodiments described herein are generally related to Artificial Intelligence (AI) to prediction using AI.

BACKGROUND

One of the AI tools for learning and predicting may be neural networks (NN). Neural networks are trained on specific datasets that include relevant data for the training task. Neural networks may be used to predict, for example, processes, movements, etc., and/or to detect faces, smiles, posture, pose, body parts, etc.

An image and/or a photo and/or a video frame was taken by a camera, and/or camcorder may include metadata. The metadata may include camera settings, time and date, shutter speed, exposure, image size, compression, camera name, color information, etc.

Sometimes, camera metadata is not applied, and one or more camera settings, such as camera lens attributes set up for each image, cannot be used to combine two or more images into one image.

Thus, there is a need to predict one or more camera lens attributes.

SUMMARY

Embodiments related to a system, a method, and a product for predicting a camera lens attribute using a neural network. are described hereinbelow by the ways of example only. The predicted camera lens parameter may be used to produce a 3D model of an object from one or more 2D images of an object.

One example of an embodiment may include a system for predicting a camera lens attribute comprising a computer device, the computer device comprises processing circuitry, wherein the processing circuitry is configured to: train a neural network on a dataset to predict the 2D keypoints to produce a trained neural network, wherein the dataset comprises an image of an object and a plurality two dimensional (2D) of keypoints; receive a first image of the object and a second image of the object from a client device; apply the trained neural network on the first image of the object to produce a first plurality of 2D keypoint predictions; apply the trained neural network on a second image of the object to produce a second plurality 2D keypoint predictions, wherein the first plurality of 2D keypoints and the second plurality of 2D keypoints comprise a plurality of visible and invisible keypoints; and calculate the camera lens attribute based on the first plurality of 2D keypoint predictions, the second plurality of 2D keypoint predictions, and a mathematics equation including a camera lens calibration matrix.

For example, the processing circuitry is configured to: produce a reconstructed three-dimensional (3D) geometry based on the calculated camera lens attribute.

For example, the processing circuitry is configured to: establish correspondence between the first plurality of keypoints of the first image showing a look from a first angle of the object to the second plurality of keypoints the second image showing a look from a second angle of the object, wherein the first angle is different from the second angle; weight the correspondence with a keypoints confidence, wherein a keypoints confidence is predicted by the trained neural network; and estimate the camera lens attribute based on the correspondence.

For example, the camera lens attribute comprises a focal length.

For example, the object comprises a face.

For example, the dataset is generated by projecting a predefined set of 3D keypoints located on a mesh surface of a 3D object to a virtual camera.

For example, the processing circuitry is configured to predict the predefined set of 3D keypoints according to a function of vertices and one or more faces.

For example, the processing circuitry is configured to generate the dataset by: computing the plurality of the 2D keypoints and fitting a 3D geometry to a 2D image of the object; extracting a plurality of 3D keypoints according to a function of the geometry; and projecting the plurality of the 3D keypoints onto the image to obtain the plurality of 2D keypoints.

For example, the processing circuitry is configured to generate the dataset—generated by: rendering a 3D model to a virtual camera to generate a rendered image of the 3D object; obtaining a plurality of 3D keypoints as a function of a 3D geometry; and projecting the plurality of 3D keypoints to the rendered image of the 3D geometry.

For example, the processing circuitry is configured to: adjust a virtual reality (VR) environment to an image based on the calculated camera lens attribute.

For example, the processing circuitry is configured to: adjust an augmented reality (AR) environment to an image based on the calculated camera lens attribute.

For example, the processing circuitry is configured to: adjust a mixed reality (MR) environment to an image based on the calculated camera lens attribute.

For example, the processing circuitry is configured to: edit an image based on the calculated camera lens attribute.

For example, the processing circuitry is configured to: edit a video frame based on the calculated camera lens attribute.

Another example of an embodiment may include a product comprising one or more tangible computer-readable non-transitory storage media comprising program instructions for predicting a camera lens attribute, wherein execution of the program instructions by one or more processors comprising: training a neural network on a dataset on the 2D keypoints to produce a trained neural network, wherein the dataset comprises an image of an object and a plurality two dimensional (2D) of keypoints; receiving a first image of the object and a second image of the object from a client device; applying the trained neural network on the first image of the object to produce a first plurality of 2D keypoint predictions; applying the trained neural network on a second image of the object to produce a second plurality 2D keypoint predictions, wherein the first plurality of 2D keypoints and the second plurality of 2D keypoints comprise a plurality of visible and invisible keypoints; and calculating a camera lens attribute based on the first plurality of 2D keypoint predictions, the second plurality of 2D keypoint predictions, and a mathematics equation including a camera lens calibration matrix.

For example, the execution of the program instructions by one or more processors comprising: producing a reconstructed three-dimensional (3D) geometry based on the calculated camera lens attribute.

For example, the execution of the program instructions by one or more processors comprising: establishing correspondence between the first plurality of keypoints of the first image showing a look from a first angle of the object to the second plurality of keypoints the second image showing a look from a second angle of the object, wherein the first angle is different from the second angle; weighting the correspondence with a keypoints confidence, wherein a keypoints confidence is predicted by the trained neural network, and estimating the camera lens attribute based on the correspondence.

For example, the camera lens attribute comprises a focal length.

For example, the object comprises a face.

For example, the dataset is generated by projecting a predefined set of 3D keypoints located on a mesh surface of a 3D object to a virtual camera.

For example, the execution of the program instructions by one or more processors comprising: predicting the predefined set of 3D keypoints according to a function of vertices and one or more faces.

For example, the execution of the program instructions by one or more processors comprises generating the reconstructed 3D geometry by: computing the plurality of the 2D keypoints and fitting a 3D geometry to a 2D image of the object; extracting a plurality of 3D keypoints according to a function of the geometry; and projecting the plurality of the 3D keypoints onto the image to obtain the plurality of 2D keypoints.

For example, the execution of the program instructions by one or more processors comprises generating the dataset by: rendering a 3D model to a virtual camera to generate a rendered image of the 3D object; obtaining a plurality of 3D keypoints as a function of a 3D geometry; and projecting the plurality of 3D keypoints to the rendered image of the 3D geometry.

For example, the execution of the program instructions by one or more processors comprising: adjusting a virtual reality (VR) environment to an image based on the calculated camera lens attribute.

For example, the execution of the program instructions by one or more processors comprising: adjusting an augmented reality (AR) to an image environment based on the calculated camera lens attribute.

For example, the execution of the program instructions by one or more processors comprising: adjusting a mixed reality (MR) to an image environment based on the calculated camera lens attribute.

For example, the execution of the program instructions by one or more processors comprising: editing an image based on the calculated camera lens attribute.

For example, the execution of the program instructions by one or more processors comprising: editing a video frame based on the calculated camera lens attribute.

It is understood that the present disclosure described a solution for shortcomings in the field of art. More specifically, the embodiments described herein enable the prediction of a camera lens attribute using AI.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units, and/or circuits have not been described in detail so as not to obscure the discussion.

Discussions made herein utilizing terms such as, for example, "processing," "computing," "calculating," "determining," "establishing," "analyzing," "checking," or the like, may refer to operation(s) and/or process(es) of a computer, a computing platform, a computing system, or other electronic computing devices, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality," as used herein, include, for example, "multiple" or "two or more." For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified, the use of the ordinal adjectives "first," "second," "third," etc., to describe a common object merely indicate that different instances of like objects are being referred to and are not intended to imply that the objects so described must be in a given sequence, either temporally, spatially, in ranking, or any other manner.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some demonstrative embodiments, the circuitry may be implemented in, or functions associated with the circuitry may be implemented by one or more software or firmware modules. In some demonstrative embodiments, the circuitry may include logic, at least partially operable in hardware.

The term "logic" may refer, for example, to computing logic embedded in the circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in and/or implemented as part of various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read-only memory, programmable memory, magnetic memory, flash memory, persistent memory, and the like. Logic may be executed by one or more processors using memory, e.g., registers, stuck, buffers, and/or the like, coupled to one or more processors, e.g., as necessary to execute the logic.

The term "module," as used hereinbelow, is an object file that contains code to extend the running kernel environment.

As used herein, the term "Artificial intelligence (AI)" is intelligence demonstrated by machines, unlike the natural intelligence displayed by humans and animals, which involves consciousness and emotionality. The term "artificial intelligence" is used to describe machines (or computers) that mimic "cognitive" functions that humans associate with the human mind, such as, for example, "learning" and "problem-solving."

The term "machine learning (ML)" as used hereinbelow is a study of computer algorithms configured to improve automatically based on a received. ML is a subset of artificial intelligence. Machine learning algorithms build a mathematical model based on sample data, known as "training data," to make predictions or decisions without being explicitly programmed to do so.

As used herein, the term "deep learning," as used hereinbelow, is a class of machine learning algorithms that uses multiple layers to extract higher-level features from the raw input progressively. For example, in image processing, lower layers may identify edges, while higher layers may identify the concepts relevant to a human, such as, for example, digits or letters and/or faces.

The term "Artificial neural networks (ANNs), and/or neural networks (NNs), are computing systems vaguely inspired by the biological neural networks that constitute animal brains.

For example, an ANN is based on a collection of connected units or nodes called artificial neurons, which loosely model the neurons in a biological brain. An artificial neuron that receives a signal may process it and may signal neurons connected to it. For example, the "signal" at a connection is a real number, and the output of each neuron is computed by some non-linear functions of the sum of its inputs. The connections are called edges. Neurons and edges may have a weight that adjusts as learning proceeds. The weight increases or decreases the strength of the signal at a connection. Neurons may have a threshold such that a signal is sent only if the aggregate signal crosses that threshold. The neurons may be aggregated into layers. Different layers may perform different transformations on their inputs.

In some demonstrative embodiments, ways to use non-wearable sensing technologies (like video) to monitor and analyze a subject and provide feedback to a user. For example, the feedback may be based on artificial intelligence (AI) trained on a dataset.

The term "dataset," as used hereinbelow, is related, but not limited to, to a dataset of human images, for example, human faces, annotated with attributes, e.g., keypoints related to, for example, the pose of a head and/or other body parts and/or the like.

The term "training," as used hereinbelow, is related to, but not limited to, the training method of one or more neural networks on one or more datasets to predict and/or to detect the attributes, e.g., a camera lens attribute. For example, a neural network may predict and/or detect one or more attributes according to a target image. The training may be done once, but not limited to, on the server.

The term "polygon mesh," as used hereinbelow is consisted of a set of polygonal faces, often triangles, that, taken together, form a surface covering of the object. The advantage of a surface mesh is that it is fast to generate and works very well for visualization.

The term "surface mesh," as used hereinbelow, is a collection of vertices, edges, and faces that defines the shape of a polyhedral object. The faces usually consist of triangles (triangle mesh), quadrilaterals (quads), or other simple convex polygons (n-gons) since this simplifies rendering but may also be more generally composed of concave polygons or even polygons with holes.

The term "fundamental matrix," as used hereinbelow, is a relationship between any two images of the same scene that constrains where the projection of points from the scene can occur in both images. The corresponding point in the other image may be constrained to a line.

The term "virtual camera," as used hereinbelow, is a camera in the virtual 3D space, e.g., in a shooter game in which the camera is attached to the head of the player.

The term "virtual reality (VR)," as used hereinbelow, is the use of computer technology to create a simulated environment. For example, unlike traditional user interfaces, VR places the user inside an experience. Instead of viewing a screen in front of them, the user is immersed and able to interact with 3D worlds. The computer technology may simulate 3D visions, voices, touch, smell, and the like.

The term "augmented reality (AR)," as used hereinbelow, is an interactive experience of a real-world environment where the objects that reside in the real world are enhanced by computer-generated perceptual information, sometimes across multiple sensory modalities, including visual, auditory, haptic, somatosensory and olfactory. AR can be defined as a system that incorporates three basic features: a combination of real and virtual worlds, real-time interaction, and accurate 3D registration of virtual and real objects.

The term "mixed reality (MR)," as used hereinbelow, is the merging of real and virtual worlds to produce new environments and visualizations, where physical and digital objects co-exist and interact in real-time. Mixed reality is a hybrid of reality and virtual reality. AR, a related term, takes place in the physical world, with information or objects added virtually. For example, there are many practical mixed reality applications, including design, entertainment, military training, and remote working. Furthermore, different display technologies may be used to facilitate interaction between users and mixed reality applications.

In some demonstrative embodiments, adding/deleting/modifying objects on the image may involve understanding a 3D scene. Understanding the 3D scene may involve understanding the depth of each image pixel and how to map the 3D scene to pixel coordinates x,y.

In some demonstrative embodiments, the method and the system may be configured to project 3D space onto camera image pixels and back. This operation involves physical camera characteristics, e.g., focal length and the like, and estimating focal length from two or more images, e.g., photos.

In some demonstrative embodiments, the generation of 3D geometry may include training neural networks to produce 3D geometry from one or more 2D images of an object. For example, the neural network may be trained on the pairs, e.g., 2D images, 3D geometry, and known camera lens parameters for 2D images. For example, the camera lens parameters may be used by the neural network to reconstruct the 3D geometry.

For example, to produce 3D geometry from 2D images once the camera lens attributes parameters leverage learning-based methods that use datasets to learn a predictor. Such a predictor may take 2D images and camera lens attributes as input and produce 3D geometry based on the camera lens attribute.

In some demonstrative embodiments, when the network is trained, it can be applied to the new data and obtain the camera lens parameter using the method described below when predicting 3D geometry with the neural network.

Figure 1:
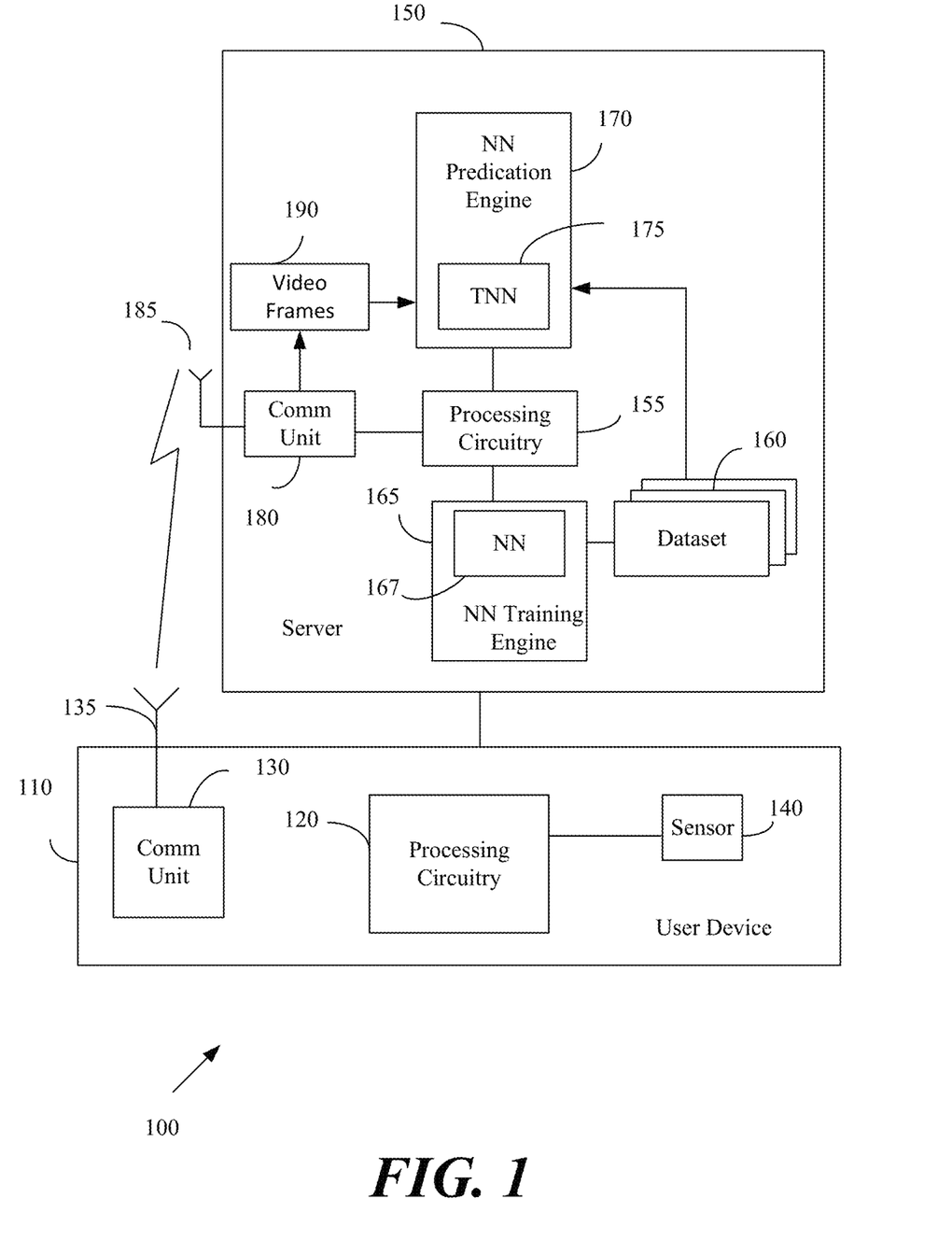
FIG. 1 illustrates a block diagram of a system for predicting one or more camera lens attributes, according to some demonstrative embodiments.

In some demonstrative embodiments, reference is first made to FIG. 1, which is an illustration of block diagrams of a system 100 for predicting one or more camera lens attributes, according to some demonstrative embodiments.

In some demonstrative embodiments, system 100 may include a computing device, e.g., a server 150 and a user device 110.

In some demonstrative embodiments, the user device 110 may include processing circuitry 120, a sensor 140, and a communication unit 130 operably coupled to one or more antennas 135.

In some demonstrative embodiments, processing circuitry 120 may include at least one of one core processor, multi-core processor, one or more processors, a graphic processor, a digital signal processor (DSP), a controller, a memory, and the like.

In some demonstrative embodiments, sensor 140 may include a video camera, a camera, and/or any other image capturing device. For example, sensor 140 may capture one or more images of an object and/or a video of the image. The communication unit 130 may transmit one or more images and/or video to server 150 via one or more antennas 135.

In some demonstrative embodiments, the one or more antenna 135 may include at least one of: a dipole antenna, an antenna array, an internal antenna, or the like.

In some demonstrative embodiments, the computing device, e.g., server 150, may include a computer, a laptop computer, a mobile device, a cellular phone, a tablet, a wireless communication device, and/or any other device.

In some demonstrative embodiments, server 150 may include processing circuitry 155, a plurality of datasets 160, a neural network (NN) training engine 165, an NN prediction engine 170, a communication unit 180 operably coupled to one or more antennas 185, and one or more video frames 190 that may be received from user device 110.

In some demonstrative embodiments, processing circuitry 155 may include at least one of one core processor, multi-core processor, one or more processors, a graphic processor, a digital signal processor (DSP), a controller, a memory, and the like.

In some demonstrative embodiments, processing circuitry 155 may be configured to perform the software instructions of the NN training engine 165. For example, the NN engine 165 may use at least one of resnet-34 architecture or Mobile-Net-V2 and/or Mobile-Net-V3 to train and model the plurality of NNs.

In some demonstrative embodiments, the NN training engine 165 may train a plurality of NN 167 on the plurality of datasets 160.

In some demonstrative embodiments, a dataset of datasets 160 may include a plurality of pairs. The pairs may include an image of an object and 2D keypoints of an object. For example, the 2D keypoints may include both visible keypoints and occluded (invisible) keypoints.

In some other demonstrative embodiments, a dataset of datasets 160 may include a plurality of real images shot by a camera, e.g., sensor 140, and a set of keypoints. For example, the keypoints may be computed based on a geometry fitted into the real images.

For example, the keypoints may include 3D keypoints that may be extracted as a function of geometry, for example, a 3D keypoint may have a position of a geometry vertex. The 3D keypoints may be projected onto the real images (assuming that the camera parameters are known) to obtain 2D keypoints, thus forming a desired dataset.

In some demonstrative embodiments, the NN 165 may include binary/multiclass classification neural networks, In some demonstrative embodiments, the NN training engine 165 may be implemented in software and/or hardware and/or as a combination of software and hardware.

In some demonstrative embodiments, the communication unit 180 may be a wireless communication device and may be configured to communicate over the air with a user device 110 via one or more antenna 185. For example, communication unit 180 may include a wireless local area network (WLAN) radio, a wireless wide area network radio (WWLAN), a cellular radio, or the like. The one or more antennas 185 may include at least one of: a dipole antenna, Yagi antenna, monopole antenna, a dish antenna, an antenna array, or the like.

In some demonstrative embodiments, communication unit 180 may receive one or more video frames 190 from a user device 110.

In some demonstrative embodiments, processing circuitry 155 may be configured to train a neural network on a dataset 160 on the 2D keypoints to produce a trained neural network, wherein the dataset comprises an image of an object and a plurality two dimensional (2D) of keypoints.

In some demonstrative embodiments, processing circuitry 155 may receive a first image of the object and a second image of the object from the user device 110. The processing circuitry 155 may apply a trained neural network (TNN) 175 on the first image of the object to produce a first plurality of 2D keypoint prediction to the NN prediction engine 170 if desired. The processing circuitry 155 may apply the trained neural network 175 on a second image of the object to produce a second plurality 2D keypoint predictions to the NN prediction engine 170 if desired In some demonstrative embodiments, the first plurality of 2D keypoints and the second plurality of 2D keypoints may include a plurality of visible and invisible keypoints.

In some demonstrative embodiments, The NN prediction engine 170 may calculate a camera lens attribute based on the first plurality of 2D keypoint predictions, the second plurality of 2D keypoint predictions, and a mathematics equation including a camera lens calibration matrix and fundamental matrix. For example, the camera lens attribute may be a focal length f.

In some demonstrative embodiments, the calculation may include, for example, applying the trained neural network 175 to all or a portion of frames, e.g., video frames 190, and may result in 2D keypoint predictions. For each or for some pairs of input frames, e.g., video frames 190, with 2D keypoint locations predicted by the neural network, and established a correspondence between the keypoints, a fundamental matrix $F_i$ is computed. For example, a normalized 8-point algorithm can be used, such as, for example, M fundamental matrices in the equation below. For example, the equation may depict as:

$$L(K, E_1,\ldots,E_M) = \sum_{i=1}^{M} \frac{2tr(E_i E_i^T)^2 - tr^2(E_i E_i^T)}{tr^2(E_i E_i^T)} \qquad \text{Eq. 1}$$

were, $$E_i = K^T F_i K$$

and, $$K = \begin{pmatrix} f & 0 & c_x \\ 0 & f & c_y \\ 0 & 0 & 1 \end{pmatrix}$$

Where $E_i$ is the essential matrix, and K is a camera calibration matrix. Principal point $c_x$, $c_y$ is assumed to be exactly in the image center, and focal length f is assumed to be the same for both image axes. The focal length f is unknown and can be obtained by minimizing L. For example, L may be minimized over selected values of f with a simple search.

In some demonstrative embodiments, the processing circuitry 155 may produce reconstructed 3D geometry based on the calculated camera lens attribute, e.g., focal length f.

In some demonstrative embodiments, the processing circuitry 155 may be configured to establish correspondence between the first plurality of keypoints of the first image showing a front look of the object to the second plurality of keypoints the second image showing a side look of the object.

In some demonstrative embodiments, the processing circuitry 155 may weight the correspondence with a keypoints coefficient and/or confidence. For example, a keypoints coefficient and/or confidence may be predicted by the trained neural network 175 and NN prediction engine 170.

In some demonstrative embodiments, the processing circuitry 155 may estimate the camera lens attribute, e.g., focal length f, based on the correspondence.

In some demonstrative embodiments, the processing circuitry 155 may be configured to predict the camera lens attribute that provides a minimal loss when producing the reconstructed 3D geometry of the object.

In some demonstrative embodiments, the processing circuitry 155 may generate the dataset by projecting a textured 3D mesh surface to a virtual camera a predefined set of 3D keypoints located on the mesh surface of a 3D object.

In some demonstrative embodiments, the processing circuitry 155 may be configured to predict the predefined set of 3D keypoints according to a function of vertices and faces.

In some demonstrative embodiments, the processing circuitry 155 may generate the reconstructed 3D geometry by computing the plurality of the 2D keypoints and fitting a geometry of the calculated 2D keypoints to a 2D image of the object, extracting a plurality of 3D keypoints according to a function of the geometry, and projecting the plurality of the 3D keypoints onto the image to obtain the plurality of 2D keypoints.

In some demonstrative embodiments, the dataset is generated by rendering a 3D model to a virtual camera to generate a rendered image of a 3D object, obtaining a plurality of 3D keypoints as a function of a 3D geometry, and projecting the plurality of 3D keypoints to the rendered image of the reconstructed 3D geometry.

Advantageously, the use of the predicted camera lens attribute enables generating an accurate 3D object from the 2D images, including the object, e.g., faces.

In some demonstrative embodiments, AR applications may extend the real environments with virtual objects/environments. Thus, there is a need for spatial and temporal alignment and synchronization between real and virtual worlds. One part of spatial alignment is to ensure that the projection of the virtual world to the real camera is done "properly". Properly means that the camera in the virtual world corresponding to a camera in the real world should have the same camera characteristics as the real camera. Such characteristics may include a focal length and etc.

In some demonstrative embodiments, processing circuitry 155 may be configured to adjust a virtual reality (VR) environment to an image based on the calculated camera lens attribute, e.g., focal length.

In some demonstrative embodiments, processing circuitry 155 may be configured to adjust an augmented reality (AR) environment to an image based on the calculated camera lens attribute, e.g., focal length.

In some demonstrative embodiments, processing circuitry 155 may be configured to adjust a mixed reality (MR) environment to an image based on the calculated camera lens attribute, e.g., focal length.

For example, projection of the virtual camera world, e.g., AR, VR, MR, to the camera in the real world may be done by adjusting the virtual camera lens attributes to the real camera lens attributes, e.g., focal length.

Advantageously, using the calculated camera lens attribute, e.g., focal length, to adjust the digital layer over the real physical layer of the frame in AR and/or MR may provide an accurate match between the layers.

In some demonstrative embodiments, processing circuitry 155 may be configured to edit an image based on the calculated camera lens attribute, e.g., focal length. For example, the editing may include adding, deleting, and modifying objects on the image and/or video frame and/or a photograph.

For example, editing may do as follows: projecting 2D image into 3D point cloud using the depth image and the camera lens attributes. Then editing the scene in 3D, and then projected the scene back to the image using the projections formulas. This may be done with either images or video, e.g., frame by frame.

For example, the 3D geometry may be projected on the 2D image by using the following equations:

$$\text{Column}=X*\text{focal}/Z+\text{wide}/2 \qquad \text{Eq. 2}$$

$$\text{Row}=-Y*\text{focal}/2+\text{height}/2 \qquad \text{Eq. 3}$$

Wherein:
 X, Y, Z are 3D coordinates in distance units such as, for example, millimeters or meters;
 focal is a focal length of the camera lens in pixels, e.g., focal=500 for VGA, height and width are the dimensions of the image or sensor in pixels;

row, column—are image pixels coordinates.

This is a standard set of coordinate systems centered on the camera center (for X, Y, Z) and on the upper-left image corner (for row, column).

In some demonstrative embodiments, processing circuitry 155 may be processing circuitry is configured to edit a video frame based on the calculated camera lens attribute, e.g., focal length.

Advantageously, by understanding the camera lens attributes, e.g., focal length, objects may be removed from the image and/or frame and/or a photograph, in a reliable way, without distortion. By correcting the camera lens attributed, e.g., focal length, accurate data of the, for example, an edited image may be provided.

Figure 2:
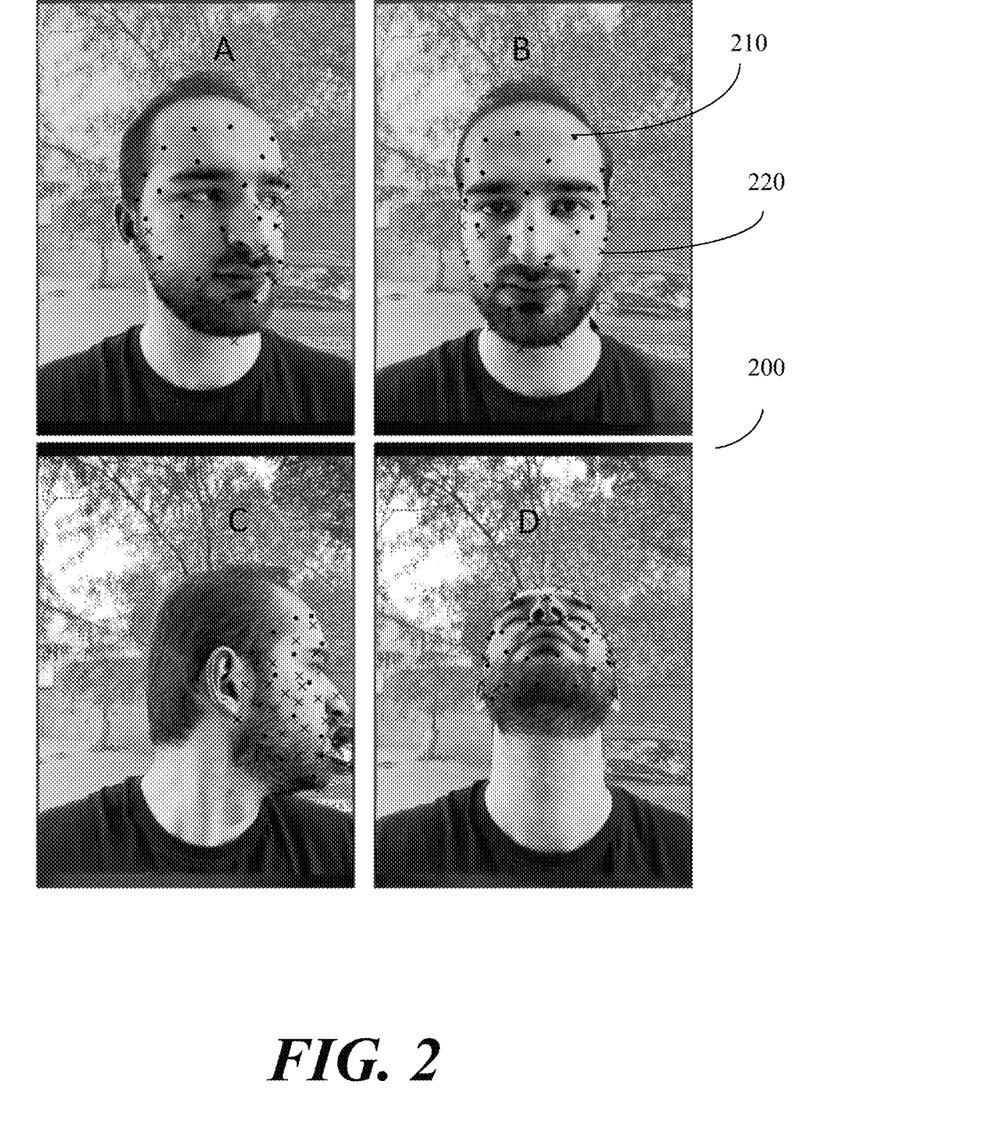
FIG. 2 illustrates a plurality of keypoints on different face views, according to some demonstrative embodiments.

Reference is now made to FIG. 2, which is an illustration 200 of a plurality of keypoints on different face views, according to some demonstrative embodiments In some demonstrative embodiments, illustration 200 may include four different poses of a humane face, e.g., an object. The black dots on the human faces at A, B, C and D, depicted visual keypoints 210, and the crosses depicted invisible keypoints 220

Figure 3:
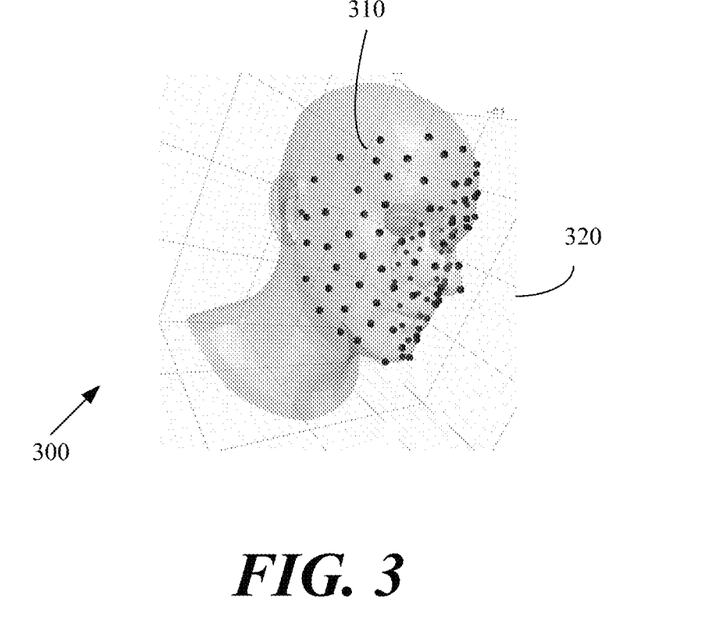
FIG. 3 illustrates a mesh topology fitted a human head and corresponding keypoints, according to some demonstrative embodiments.

Reference is now made to FIG. 3, which is an illustration of a mesh topology fitted a human head and corresponding keypoints, according to some demonstrative embodiments In some demonstrative embodiments, a 3D head 300 may be mapped with a plurality of keypoints 310 according to a mesh topology 320. For example, a vertex of the 3D geometry that is fitted into the 3D head 300 may be a 3D keypoint 320.

Another example may be to sample uniformly keypoints 320 on the surface of the mesh 320. In general, there is no need to take points from the surface as 3D keypoints, for example, it can be assumed that a 3D keypoint may lie at a 1 cm distance from a particular vertex. So, the most general way to define an i'th keypoint is:

$$K\_i = F_i(V, I) \qquad \text{Eq. 2}$$

Where V—is the set of vertices,

I—is a set of faces of the 3D mesh.

F_i—is a function for the i'th keypoint.

In some demonstrative embodiments, in order to obtain an image of an object, a 3D model may be rendered by a virtual camera. To obtain the keypoints on the 3D object, e.g., head 300, a predefined set of points on the mesh surface may be projected to the camera.

Figure 4:
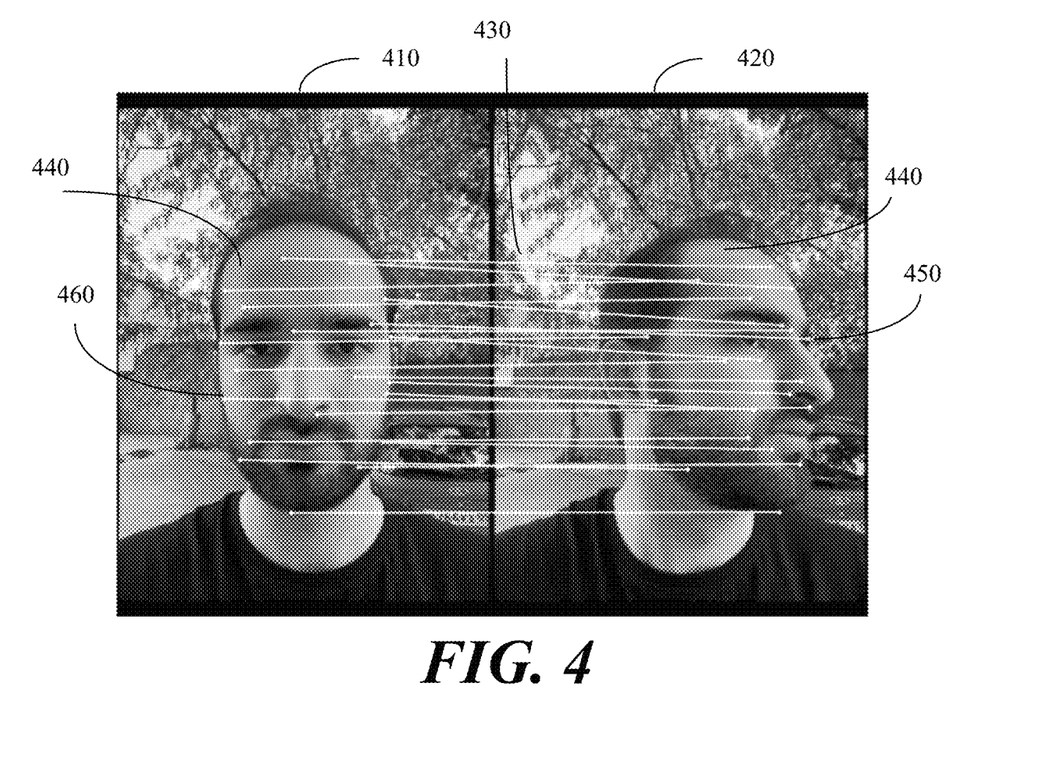
FIG. 4 illustrates a correspondence of a plurality of keypoints on different face views between images, according to some demonstrative embodiments.

Reference is now made to FIG. 4, which is an illustration of a correspondence of a plurality of keypoints on different face views between images, according to some demonstrative embodiments.

For example, FIG. 4 includes two video frames 410, 420 of an object 440, e.g., a human head. Video frame 410 shows a front look of object 440, and video frame 420 shows a side look of object 440. Object 440 in video frame 410 may be marked with a plurality of keypoints 460, and object 440 in video frame 420 may be marked with a plurality of keypoints 450. The keypoints 450 and 460 may include visible and invisible keypoints. Keypoints 450 are connected to keypoints 460 by correspondence lines 430.

In some demonstrative embodiments, a trained neural network may be applied to object 440 of video frame 410 and video frame 420 to predict 2D keypoints on the object 440. The keypoints 460 and 450 may be predicted on both video frames faces 440, e.g., video frames 410 and 420. The trained NN may form correspondence lines 430 between the video frames, e.g., video frames 410 and 420. The correspondence line may be weighted with confidence, based on keypoint confidence predicted by trained NN.

In some demonstrative embodiments, the correspondences 430 may be used to estimate the camera lens attribute, e.g., focal length, for example, by using Eq. 1 as described above.

Figure 5:
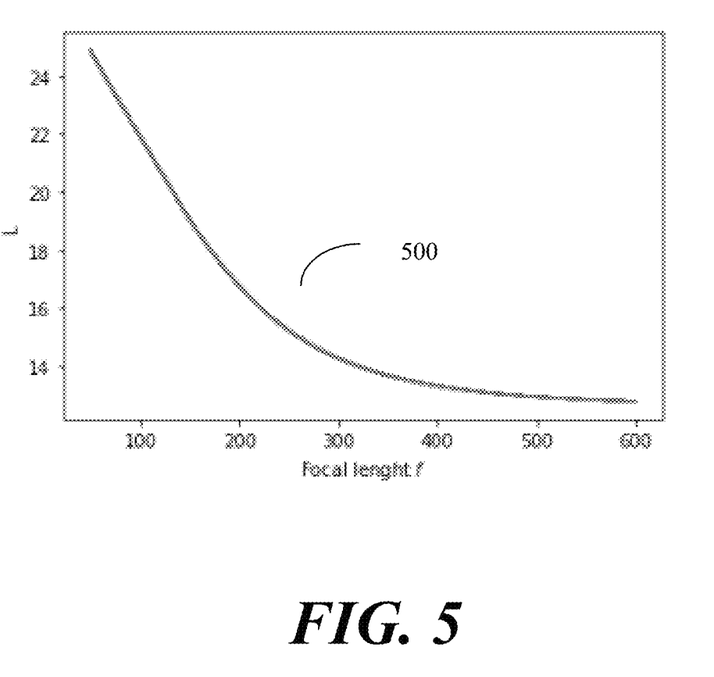
FIG. 5 illustrates a loss function of focal length for the case where only visible keypoints are used, according to some demonstrative embodiments.
Figure 6:
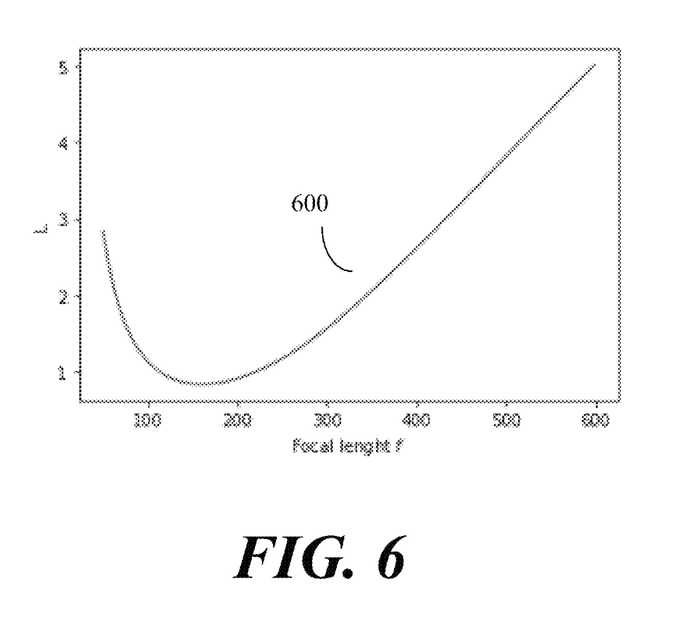
FIG. 6 illustrates a loss function of focal length for the case where both visible and invisible keypoints are used, according to some demonstrative embodiments.

In some demonstrative embodiments, reference is now made to FIG. 5 that shows a loss as a function of a focal length 500 for the case where only visible keypoints are used, and to FIG. 6 shows a loss as a function of a focal length 600 for the case where both visible and invisible key points are used. Advantageously, the significance of using both visible and occluded keypoints as shown by FIG. 6, is that the calibration procedure based on the focal length does not work if only visible keypoints are used. Thus, the prediction of the position of the invisible keypoints on the object improves the loss surface L by making the Arg min of L (used in optimization) closer to the real focal length.

Figure 7:
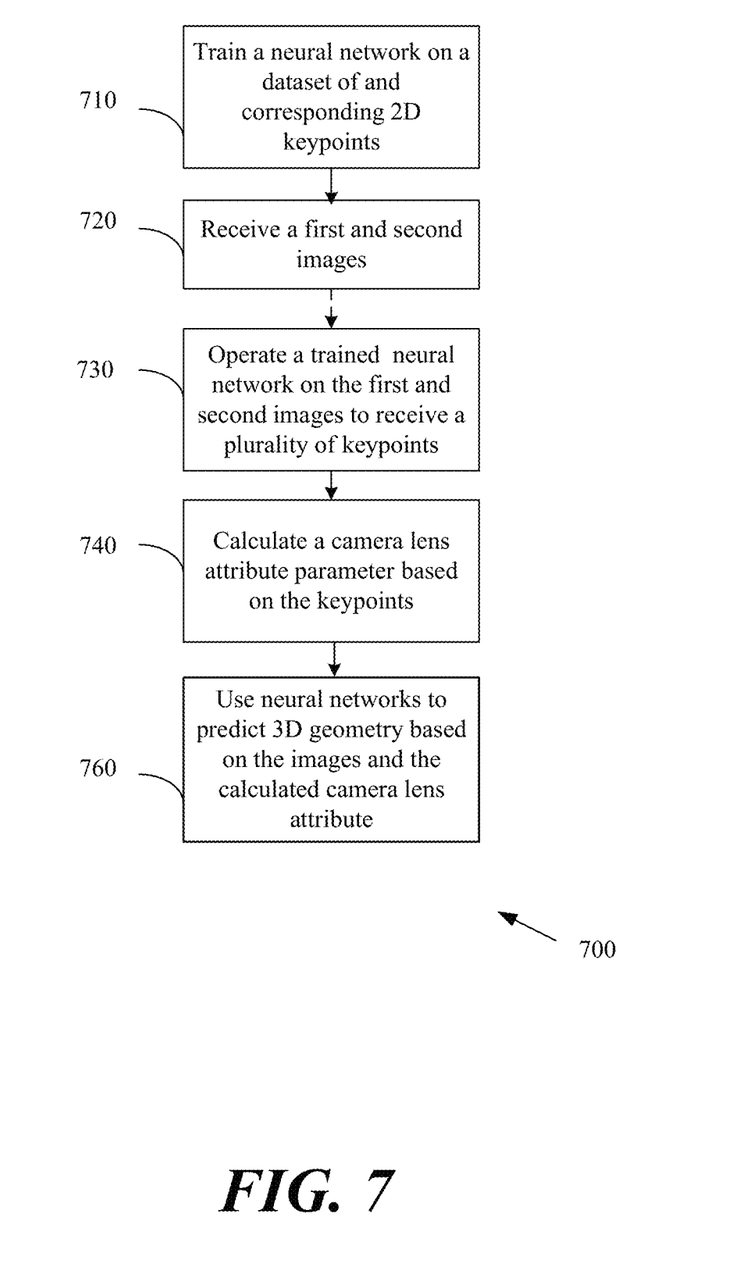
FIG. 7 illustrates a flow chart of a method for producing a reconstructed 3D geometry based on a predicted camera lens attribute, according to some demonstrative embodiments.

According to some demonstrative embodiments, reference is now made to FIG. 7 that illustrates a flow chart of a method 700 for producing a reconstructed 3D geometry based on a predicted camera lens attribute.

In some demonstrative embodiments, method 700 may start with the training of one or more neural networks on one or more one or more datasets to produce one or more datasets (text box 710). For example, the server, e.g., server 150, FIG. 1, may receive first and second images, for example, from a user device (text box 720). For example, the first and second images may be video frames and/or still images.

In some demonstrative embodiments, the trained neural network may apply a plurality of visible and invisible keypoints to the first and second images (text box 730), then, for example, a processor circuitry 155 of FIG. 1 may calculate a camera lens attribute, e.g., focal length. For example, the calculation may be done on the keypoints with a fundamental matrix to receive a camera calibration matrix (text box 740).

In some demonstrative embodiments, neural networks may be used to predict the 3D geometry based on the first and second images and the calculated camera lens attribute, e.g., focal length (text box 760)

Figure 8:
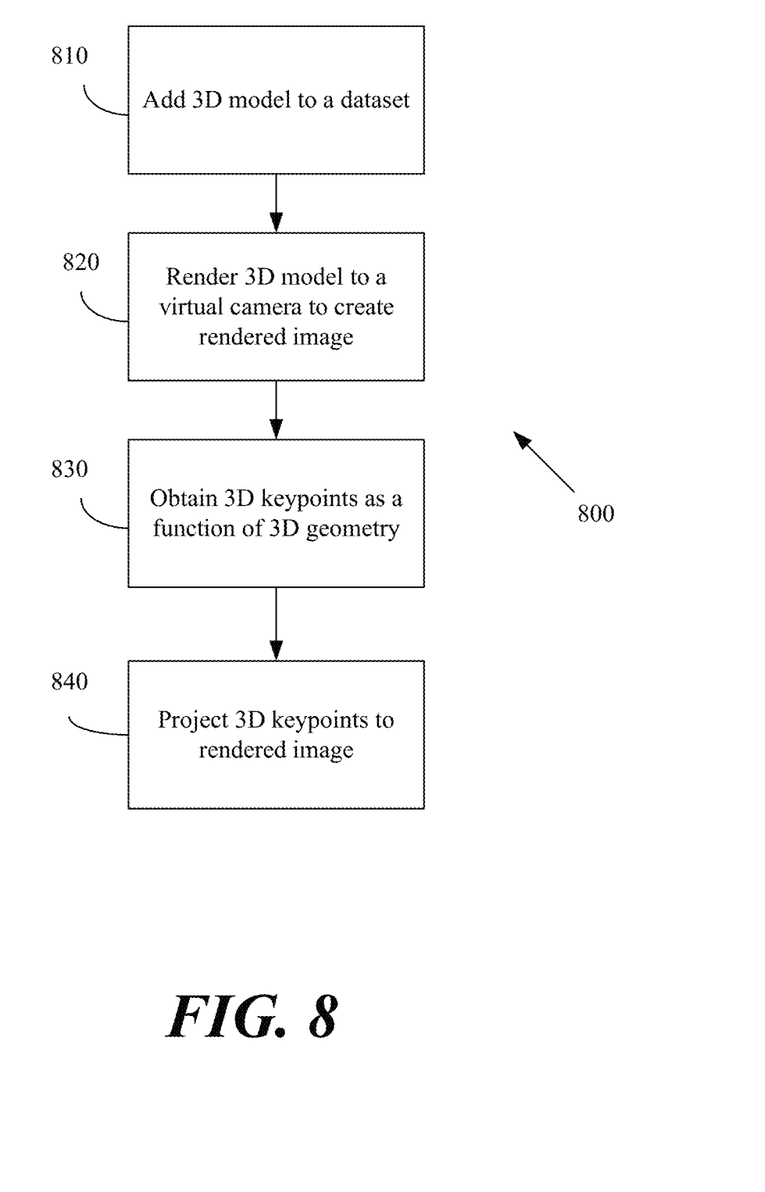
FIG. 8 illustrates a flow chart of a method producing a dataset of images and 2D keypoints using a dataset of a 3D models, according to some demonstrative embodiments.

According to some demonstrative embodiments, reference is now made to FIG. 8, which is a schematic illustration of a flow chart of a method 800 of producing a dataset of images and 2D keypoints using a dataset of textured 3D models, according to some demonstrative embodiments.

In some demonstrative embodiments, the production of the dataset of images and 2D keypoints may start with adding a 3D model to a dataset (text box 810). The 3D model may be rendered to a virtual camera (text box 820).

In some demonstrative embodiments, a plurality of keypoints may be obtained as a function of 3D geometry (text box 830) and may be projected to the rendered images (text box 840).

Figure 9:
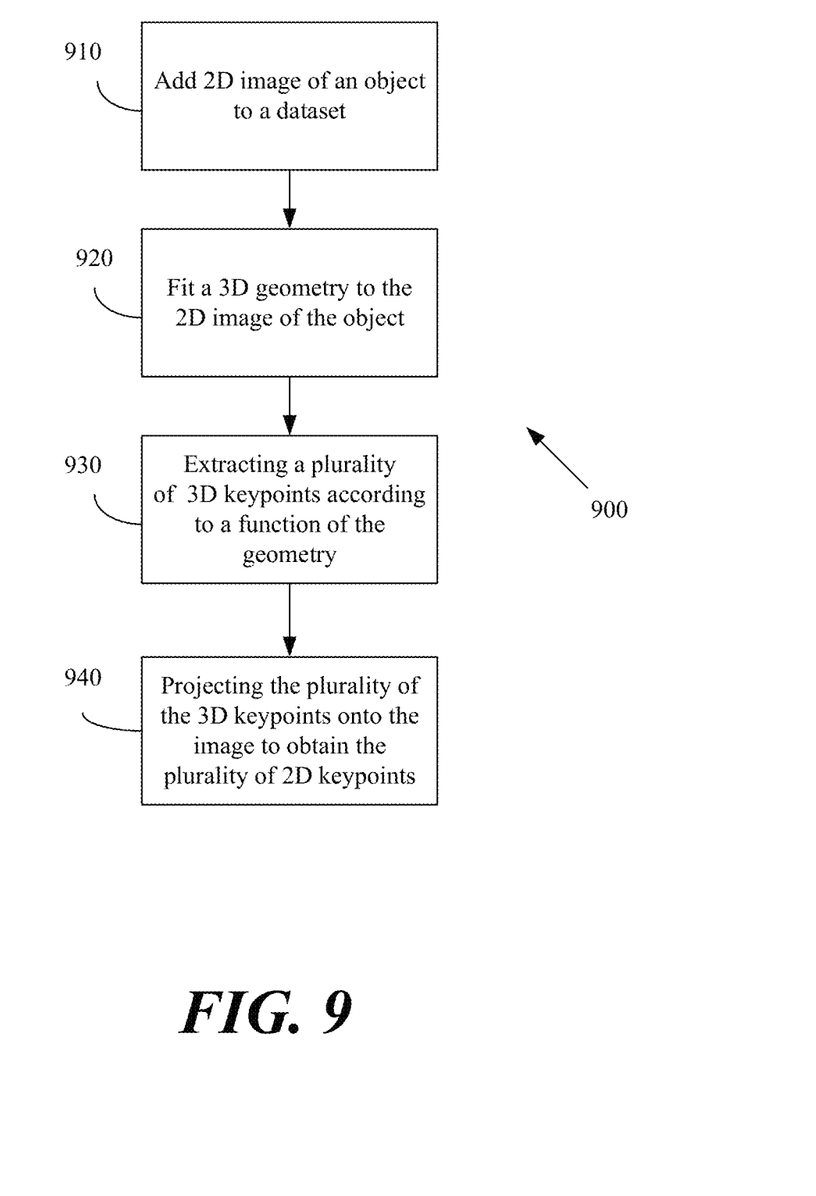
FIG. 9 illustrates a flow chart of a method producing a dataset based on images and fitting 3D geometry to a 2D image, according to some demonstrative embodiments

According to some demonstrative embodiments, reference is now made to FIG. 9 which illustrates a flow chart of a method 900 for producing a dataset based on images and fitting 3D geometry to a 2D image, according to some demonstrative embodiments In some demonstrative embodiments, method 900 may be done on a server, e.g., server 150 (FIG. 1). Method 900 may start with adding a 2D image and/or photo and/or video frame of an object to a dataset (text box 910), e.g., dataset 160 (FIG. 1). Method 900 may continue with fitting 3D geometry to the 2D image of the object (text box 920) and extracting a plurality of 3D keypoints according to a function of geometry (text box 930).

In some demonstrative embodiments, method 900 may end by projecting the plurality of 3D keypoints onto the 2D image of the object to obtain the plurality of the 2D key points (text box 940).

Figure 10:
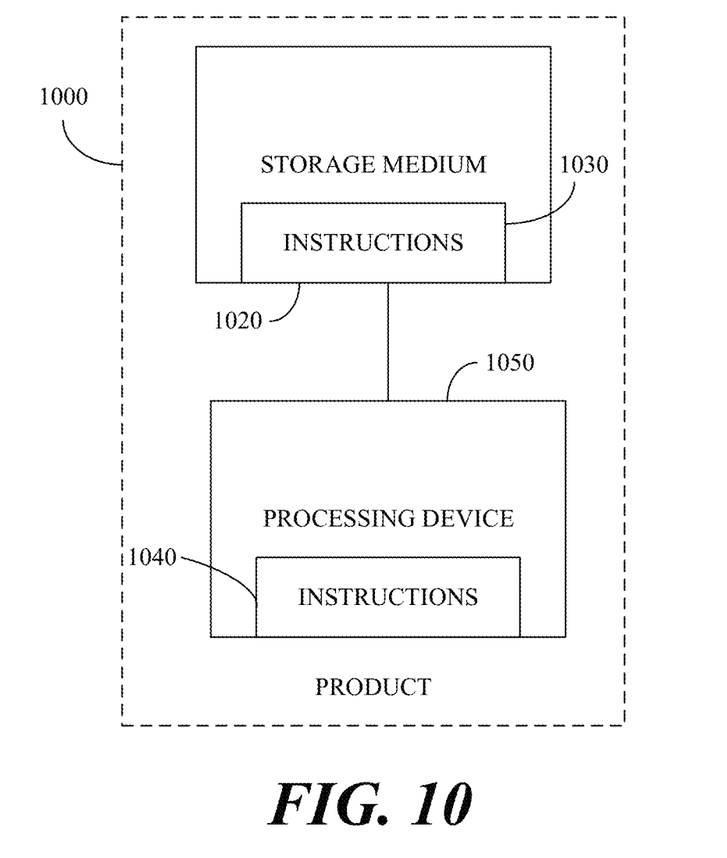
FIG. 10 illustrates a product of manufacture, according to some demonstrative embodiments.

According to some demonstrative embodiments, reference is now made to FIG. 10, which is a schematic illustration of a product of manufacture 1000. Product 1000 may include one or more tangible computer-readable non-transitory storage medium 1020, which may include computer-executable instructions 1030, implemented by processing device 1050, operable to, when executed by at least one computer processor, enable at least one processing circuitry 155 (FIG. 1) to implement one or more program instructions for producing a reconstructed 3D geometry of an object by using neural networks as described above with reference to FIGS. 1-9. The phrase "non-transitory machine-readable medium" is directed to include all computer-readable media, with the sole exception being a transitory propagating signal.

In some demonstrative embodiments, product 1000 and/or machine-readable storage medium 1020 may include one or more types of computer-readable storage media capable of storing data, including volatile memory, non-volatile memory, removable or non-removable memory, erasable or non-erasable memory, writeable or re-writeable memory, and the like. For example, machine-readable storage medium 420 may include any type of memory, such as, for example, RAM, DRAM, ROM, programmable ROM (PROM), erasable programmable ROM (EPROM), electrically erasable programmable ROM (EEPROM), Flash memory, a hard disk drive (HDD), a solid-state disk drive (SSD), fusen drive, and the like. The computer-readable storage media may include any suitable media involved with downloading or transferring a computer program from a remote computer to a requesting computer carried by data signals embodied in a carrier wave or other propagation medium through a communication link, e.g., a modem, radio, or network connection.

In some demonstrative embodiments, processing device 1050 may include logic. The logic may include instructions, data, and/or code, which, if executed by a machine, may cause the machine to perform a method, process, and/or operations as described herein. The machine may include, for example, any suitable processing platform, computing platform, computing device, processing device, a computing system, processing system, computer, processor, or the like, and may be implemented using any suitable combination of hardware, software, firmware, and the like.

In some demonstrative embodiments, processing device 1050 may include or may be implemented as software, firmware, a software module, an application, a program, a subroutine, instructions, an instruction set, computing code, words, values, symbols, and the like. Instructions 1040 may include any suitable types of code, such as source code, compiled code, interpreted code, executable code, static code, dynamic code, and the like. Instructions may be implemented according to a predefined computer language, manner or syntax, for instructing a processor to perform a specific function. The instructions may be implemented using any suitable high-level, low-level, object-oriented, visual, compiled, and/or interpreted programming languages, such as C, C++, C#, Java, Python, BASIC, Matlab, assembly language, machine code, markup language, and the like.

It is to be understood that the system and/or the method of predicting one or more camera lens attributes using neural networks is described hereinabove by way of example only. Other embodiments may be implemented based on the detailed description and the claims that followed.

It is to be understood that like numerals in the drawings represent like elements through the several figures and that not all components and/or steps described and illustrated with reference to the figures are required for all embodiments or arrangements.

It should also be understood that the embodiments, implementations, and/or arrangements of the systems and methods disclosed herein can be incorporated as a software algorithm, application, program, module, or code residing in hardware, firmware, and/or on a computer useable medium (including software modules and browser plug-ins) that can be executed in a processor of a computer system or a computing device to configure the processor and/or other elements to perform the functions and/or operations described herein.

It should be appreciated that according to at least one embodiment, one or more computer programs, modules, and/or applications that, when executed, perform methods of the present invention need not reside on the single computer or processor but can be distributed in a modular fashion amongst a number of different computers or processors to implement various aspects of the systems and methods disclosed herein.

Thus, illustrative embodiments and arrangements of the present systems and methods provide a computer-implemented method, computer system, and computer program product for processing code(s). The flowchart and block diagrams in the Figures illustrate the architecture, functionality, and operation of possible implementations of systems, methods, and computer program products according to various embodiments and arrangements. In this regard, each block in the flowchart or block diagrams can represent a module, segment, or portion of code, which comprises one or more executable instructions for implementing the specified logical function(s).

It should also be noted that, in some alternative implementations, the functions noted in the block can occur out of order noted in the figures. For example, two blocks shown in succession may be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by particular purpose hardware-based systems that perform the specified functions or acts or combinations of specialized purpose hardware and computer instructions.

The terminology used herein is to describe particular embodiments only and is not intended to be limiting the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein are for the purpose of description and should not be regarded as limiting. The use of "including," "comprising," or "having," "containing," "involving," and variations thereof herein is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described and without departing from the true spirit and scope of the present invention, which is set forth in the following claims.

What is claimed is:

1. A system for predicting a camera lens attribute comprising a computer device, the computer device comprises processing circuitry, wherein the processing circuitry is configured to:
   generate a dataset by computing a plurality of two-dimensional (2D) keypoints predictions and fitting a geometry of the computed 2D keypoints predictions to an image of an object, extracting a plurality of three-dimensional (3D) keypoints according to a function of the geometry and projecting the plurality of the 3D keypoints onto the image to obtain the plurality of 2D keypoints predictions;
   train a neural network on the dataset to produce a trained neural network, wherein the dataset comprises the image of the object and the plurality of 2D keypoints predictions;
   receive a first image of the object and a second image of the object from a client device;
   operate the trained neural network on the first image of the object to produce a first plurality of 2D keypoints predictions;
   operate the trained neural network on a second image of the object to produce a second plurality 2D keypoints predictions, wherein the first plurality of 2D keypoints predictions and the second plurality of 2D keypoints predictions comprise a plurality of visible and invisible keypoints predictions; and
   calculate the camera lens attribute based on the first plurality of 2D keypoints predictions, the second plurality of 2D keypoints predictions, and a mathematics equation including a camera lens calibration matrix.

2. The system of claim 1, wherein the processing circuitry is configured to:
   produce a reconstructed three-dimensional (3D) geometry based on the calculated camera lens attribute and the first and second images of the object.

3. The system of claim 1, wherein the processing circuitry is configured to:
   establish correspondence between the first plurality of keypoints predictions of the first image showing a look from a first angle of the object to the second plurality of keypoints predictions of the second image showing a look from a second angle of the object, wherein the first angle is different from the second angle;
   weight the correspondence with a keypoints confidence, wherein the keypoints confidence is predicted by the trained neural network; and
   estimate the camera lens attribute based on the correspondence.

4. The system of claim 1, wherein the camera lens attribute comprises a focal length.

5. The system of claim 1, wherein the object comprises a face.

6. The system of claim 1, wherein the dataset is generated by projecting a predefined set of 3D keypoints located on a mesh surface of a 3D object to a virtual camera.

7. The system of claim 6, wherein the processing circuitry is configured to predict the predefined set of 3D keypoints according to a function of vertices and one or more faces.

8. The system of claim 1, wherein the processing circuitry is configured to:
   adjust a virtual reality (VR) environment to an image based on the calculated camera lens attribute.

9. The system of claim 1, wherein the processing circuitry is configured to:
   adjust an augmented reality (AR) environment to an image based on the calculated camera lens attribute.

10. The system of claim 1, wherein the processing circuitry is configured to:
    edit an image based on the calculated camera lens attribute.

11. The system of claim 1, wherein the processing circuitry is configured to:
    edit a video frame based on the calculated camera lens attribute.

12. A product comprising one or more tangible computer-readable non-transitory storage media comprising program instructions for predicting a camera lens attribute, wherein execution of the program instructions by one or more processors comprising:
    generating a dataset by computing a plurality of two-dimensional (2D) keypoints predictions and fitting a geometry of the computed 2D keypoints predictions to an image of an object, extracting a plurality of three-dimensional (3D) keypoints according to a function of the geometry and projecting the plurality of the 3D keypoints onto the image to obtain the plurality of 2D keypoints predictions;
    training a neural network on the dataset to produce a trained neural network, wherein the dataset comprises the image of the object and the plurality of 2D keypoints predictions;
    receiving a first image of the object and a second image of the object from a client device;
    operating the trained neural network on the first image of the object to produce a first plurality of 2D keypoints predictions;
    operating the trained neural network on a second image of the object to produce a second plurality 2D keypoints predictions, wherein the first plurality of 2D keypoints predictions and the second plurality of 2D keypoints predictions comprise a plurality of visible and invisible keypoints predictions; and
    calculating a camera lens attribute based on the first plurality of 2D keypoints predictions, the second plurality of 2D keypoints predictions, and a mathematics equation including a camera lens calibration matrix.

13. The product of claim 12, wherein the execution of the program instructions by one or more processors comprising:
    producing a reconstructed three-dimensional (3D) geometry based on the calculated camera lens attribute.

14. The product of claim 13, wherein the execution of the program instructions by one or more processors comprising:
    establishing correspondence between the first plurality of keypoints predictions of the first image showing a look from a first angle of the object and the second plurality of keypoints predictions of the second image showing a look from a second angle of the object, wherein the first angle is different from the second angle;
    weighting the correspondence with a keypoints confidence, wherein the keypoints confidence is predicted by the trained neural network; and estimating the camera lens attribute based on the correspondence.

15. The product of claim 12, wherein the camera lens attribute comprises a focal length.

16. The product of claim 12, wherein the object comprises a face.

17. The product of claim 12, wherein the dataset is generated by projecting a predefined set of 3D keypoints located on a mesh surface of a 3D object to a virtual camera.

18. The product of claim 17, wherein the execution of the program instructions by one or more processors comprising: predicting the predefined set of 3D keypoints according to a function of vertices of a face.

19. The product of claim 12, wherein the execution of the program instructions by one or more processors comprising: adjusting a virtual reality (VR) environment to an image based on the calculated camera lens attribute.

20. The product of claim 12, wherein the execution of the program instructions by one or more processors comprising: adjusting an augmented reality (AR) environment to an image based on the calculated camera lens attribute.

21. The product of claim 12, wherein the execution of the program instructions by one or more processors comprising: editing an image based on the calculated camera lens attribute.

22. The product of claim 12, wherein the execution of the program instructions by one or more processors comprising: editing a video frame based on the calculated camera lens attribute.

23. A system for predicting a camera lens attribute comprising a computer device, the computer device comprises processing circuitry, wherein the processing circuitry is configured to:
   generate a dataset by: fitting a geometry of an object to an image, extracting a plurality of 3D keypoints according to a function of the geometry, and projecting the plurality of the 3D keypoints onto the image to obtain a first plurality of two-dimensional (2D) keypoints predictions;
   train a neural network on the dataset to produce a trained neural network, wherein the trained neural network is configured to produce a second plurality of 2D keypoints predictions;
   receive a first image of the object and a second image of the object from a client device;
   operate the trained neural network on the first image of the object to produce a third plurality of 2D keypoints predictions;
   operate the trained neural network on a second image of the object to produce a fourth plurality 2D keypoints predictions, wherein the third plurality of 2D keypoints predictions and the fourth plurality of 2D keypoints predictions comprise a plurality of visible and invisible keypoints predictions; and
   calculate the camera lens attribute based on the third plurality of 2D keypoints predictions, the fourth plurality of 2D keypoints predictions, and a mathematics equation including a camera lens calibration matrix.

24. A product comprising one or more tangible computer-readable non-transitory storage media comprising program instructions for predicting a camera lens attribute, wherein execution of the program instructions by one or more processors comprising:
   generating a dataset by: fitting a geometry of two-dimensional (2D) keypoints predictions to an image of an object; extracting a plurality of three-dimensional (3D) keypoints according to a function of the geometry and projecting the plurality of the 3D keypoints onto the image to obtain a first plurality of 2D keypoints predictions;
   training a neural network on the dataset to produce a trained neural network, wherein the trained neural network is configured to produce a second plurality of 2D keypoints predictions;
   receiving a first image of the object and a second image of the object from a client device;
   operating the trained neural network on the first image of the object to produce a third plurality of 2D keypoints predictions;
   operating the trained neural network on a second image of the object to produce a fourth plurality 2D keypoints predictions, wherein the third plurality of 2D keypoints predictions and the fourth plurality of 2D keypoints predictions comprise a plurality of visible and invisible keypoints predictions; and
   calculating a camera lens attribute based on the third plurality of 2D keypoints predictions, the fourth plurality of 2D keypoints predictions, and a mathematics equation including a camera lens calibration matrix.

* * * * *